United States Patent [19]

Longree

[11] Patent Number: 5,233,862
[45] Date of Patent: Aug. 10, 1993

[54] APPARATUS FOR DETERMINING THE TORQUE EXERTED ON A SEALING RING THAT SEALS A DUCT GAP BETWEEN A HOUSING AND A SHAFT

[75] Inventor: Alexander Longree, Mülheim a.d. Ruhr, Fed. Rep. of Germany

[73] Assignee: Siemens Aktiengesellschaft, Munich, Fed. Rep. of Germany

[21] Appl. No.: 740,812

[22] Filed: Aug. 6, 1991

[30] Foreign Application Priority Data

Aug. 10, 1990 [EP] European Pat. Off. ......... 90115419.5

[51] Int. Cl.$^5$ ............................................. G01N 3/056
[52] U.S. Cl. ................................................ 73/9; 73/10
[58] Field of Search ............... 73/9, 10, 53.05, 862.49, 73/862.35; 277/2, 901; 340/682

[56] References Cited

U.S. PATENT DOCUMENTS

| | | | |
|---|---|---|---|
| 2,972,881 | 10/1956 | Koch | 73/9 |
| 3,176,497 | 4/1965 | Dega | 73/9 |
| 3,271,995 | 10/1966 | Bäumler | 73/9 |
| 3,362,213 | 1/1968 | Van Deven et al. | 73/9 |

FOREIGN PATENT DOCUMENTS

| | | | |
|---|---|---|---|
| 3723729 | 1/1989 | Fed. Rep. of Germany . | |
| 724963 | 3/1980 | U.S.S.R. | 73/9 |
| 1506322 | 9/1989 | U.S.S.R. | 73/9 |
| 760781 | 11/1956 | United Kingdom . | |

*Primary Examiner*—Hezron E. Williams
*Assistant Examiner*—Nashmiya Ashraf
*Attorney, Agent, or Firm*—Herbert L. Lerner; Laurence A. Greenberg

[57] ABSTRACT

A configuration for sealing off a duct gap between a housing wall and a shaft includes a sealing ring surrounding the shaft to be set into rotation relative to the housing wall. The sealing ring is sealed off with respect to the housing wall and the shaft. The sealing ring is displaceable relative to the housing wall and is incapable of being set into rotation by the shaft. At least one spring element is to be placed under a mechanical strain by a torque exerted upon the sealing ring by the rotation of the shaft. The strain is determined and a report is issued, if the strain deviates substantially from a predeterminable normal value.

11 Claims, 3 Drawing Sheets

APPARATUS FOR DETERMINING THE TORQUE EXERTED ON A SEALING RING THAT SEALS A DUCT GAP BETWEEN A HOUSING AND A SHAFT

BACKGROUND AND SUMMARY OF THE INVENTION

The invention relates to a configuration for sealing off a duct or feed-through gap between a housing wall and a shaft to be set into rotation relative to the housing wall, and a sealing ring surrounding the shaft, being sealed with respect to both the housing wall and the shaft and being displaceable relative to the housing wall but not able to be set into rotation by the shaft.

Such "shaft seals" have manifold uses, especially in cases in which the duct of a shaft passing through the wall of a housing is to be sealed, and in which the housing is intended to enclose some fluid other than air. Such devices are necessary, for instance, for shafts of turbo generators that are cooled with a gas, such as hydrogen. When using the seals, it is unimportant to determine whether the pressure of the fluid to be enclosed in the housing is greater or less than the ambient pressure.

Shaft seals of that type are disclosed in German Published, Non-Prosecuted Application DE 37 23 729 A1 and British Patent No. 760,781, for example. Those documents in particular demonstrate versatile possibilities for further developments of the shaft seals. German Published, Non-Prosecuted Application DE 37 23 729 A1 relates to the configuration of a sealing ring on the housing wall having the duct. That sealing ring is not rotatable relative to the housing wall, yet it is intended to be easily displaceable for the sake of centering. In British Patent No. 760,781, versatile possibilities for supplying sealing and/or lubricating fluid to the gap between the sealing ring, housing wall and shaft are disclosed.

The invention relates to possibilities for monitoring the function of a shaft seal of the above-mentioned type. In many cases, namely in large electrical machines and the like, the shaft rotates relative to the housing wall and the sealing ring at high speed (typically 3000 rpm, for turbo generators). Very high demands must accordingly be made for the slidability of the sealing ring on the shaft, and an especially heavy-duty lubrication must typically be provided. Functional monitoring of the seal is desirable in many cases. Such functional monitoring has already been achieved by measuring the temperature of the regions of the sealing ring immediately adjacent the shaft, using suitable sensors. That measuring method is somewhat sluggish, because of the thermal capacity of the sealing ring. Worsening of the sliding properties cannot be recognized until the sealing ring has eventually heated up markedly, so that damage to the sealing ring and/or shaft can only be recognized after some delay. It is accordingly an object of the invention to provide a configuration for sealing off a duct gap between a housing wall and a shaft, which overcomes the hereinafore-mentioned disadvantages of the heretofore-known devices of this general type and which furnishes a capability of ascertaining worsening in the sliding between the sealing ring and shaft without considerable time lag, and thus makes it possible to avert material damage by taking precautions.

With the foregoing and other objects in view there is provided, in accordance with the invention, a configuration for sealing off a duct gap between a housing wall and a shaft, comprising a sealing ring surrounding a shaft to be set into rotation relative to a housing wall, the sealing ring being sealed off with respect to the housing wall and the shaft, the sealing ring being displaceable relative to the housing wall and being incapable of being set into rotation by the shaft, at least one spring element to be placed under a mechanical strain by a torque exerted upon the sealing ring by the rotation of the shaft, and means for determining the strain and issuing a report, if the strain deviates substantially from a predeterminable normal value.

Since the torque exerted on the sealing ring by the rotation of the shaft is measured directly according to the invention, immediate recognition of any change in the sliding behavior between the shaft and the sealing ring is possible. The time lag associated with the requirement for a certain accumulation of the thermal energy produced by friction is accordingly absent, and a measurement value that directly describes the sliding behavior of the sealing ring on the shaft is available and can be monitored permanently, not only in order to recognize damage that has already begun but also to discover warning signs heralding damage if operation were to be continued.

In accordance with another feature of the invention, the means for determining the mechanical strain of the spring element include at least one measurement pickup located on the spring element and an evaluation device belonging to and being associated with the pickup for evaluating the signals of the measurement pickup and issuing the report.

Electromechanical sensors which can be connected to appropriate interfaces of typical electronic evaluation devices are particularly possible as the measurement pickups. Advantageously, a plurality of measurement pickups are secured to various points of the spring element and wired to one another in a suitable manner. For instance, four strain gauges may be mounted on the spring element and connected to one another to make a Wheatstone bridge. In this way, influences that are disruptive on the measurement of the mechanical strain, which as can be caused, for instance, by temperature influences, can be suppressed. The accuracy of measurement and thus the reliability of the monitoring can be increased considerably.

In the simplest case, the report is an acoustical or optical signal, which is used to order an operator of an apparatus having the configuration as a component, to stop the shaft. However, in the context of the invention, it is also possible to use the measurement values in a suitable automatic system for regulating the flow of lubricant to the sealing ring.

Therefore, in accordance with a further feature of the invention, there is provided a delivery device for delivering the lubricant being coupled with the means for strain measurement and being regulated by the signals generated there.

In accordance with an added feature of the invention, there is provided a bending bar as the spring element, which can be flexed by the torque exerted upon the sealing ring and is provided with at least one electrical measurement pickup, namely at least one strain gauge, along with an associated electrical evaluation device.

Various possibilities exist for attaching the bending bar. For instance, in accordance with an additional feature of the invention, the bending bar is anchored firmly to the housing wall, and the sealing ring has a protrusion to be pressed against the bending bar by the torque so that the bending bar is bent elastically.

Measurement pickups, such as strain gauges with which the bending can be measured, are mounted on the bending bar in a known manner. Naturally, instead of being provided with a protrusion, the sealing ring may be provided with a slit through which the bending bar is inserted. Furthermore, the bending bar can also be joined to the sealing ring directly, for instance by being screwed into an appropriate bore in the sealing ring extending at right angles to the shaft.

In such a case, in accordance with yet another feature of the invention, there is provided an abutment firmly anchored to the housing wall, against which the bending bar is pressed by the torque. As noted above, the bending bar should be equipped with suitable measurement pickups.

In accordance with yet a further feature of the invention, in any embodiment of the invention with a spring element in the form of a bending bar, the bending bar has a plurality of measurement pickups furnishing complementary signals to determine the bending, the torque always effects the bending of the bending bar in a certain bending direction at a tangent with respect to the rotation, each side of the bending bar defining the bending bar along the bending direction has a measurement pickup, in particular a strain gauge, and during the bending, a compressive strain occurs on one side, while a tensile strain occurs on the other.

This means that the various measurement pickups produce complementary signals, and combining them can increase the accuracy of the strain measurement. Non-linearities in the measuring process can also be suppressed, so that the configuration of a bending bar with two measurement pickups for complementary signals is particularly well suited for inclusion in a closed-loop control device such as the aforementioned regulator for delivering the sealing and/or lubricating fluid to the sealing ring.

Besides the known strain gauges, piezoelectric measurement pickups may also be used as the measurement pickups. In accordance with a concomitant feature of the invention, the measurement pickups are introduced between an abutment being firmly joined to the housing wall and a protrusion of the sealing ring. As a result of the torque, the protrusion presses against the abutment and thus presses on the piezoelectric measurement pickup, producing an electrical voltage that can be measured by conventional means.

Naturally, various types of measurement pickups may be provided. On one hand, this may introduce redundancy into the strain measurement, which may be important for safety reasons, and on the other hand it can increase the accuracy of the measurement process by combining a plurality of measuring methods, optionally with measuring ranges that differ from one another.

Other features which are considered as characteristic for the invention are set forth in the appended claims.

Although the invention is illustrated and described herein as embodied in a configuration for sealing off a duct gap between a housing wall and a shaft, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION

Figure 1:
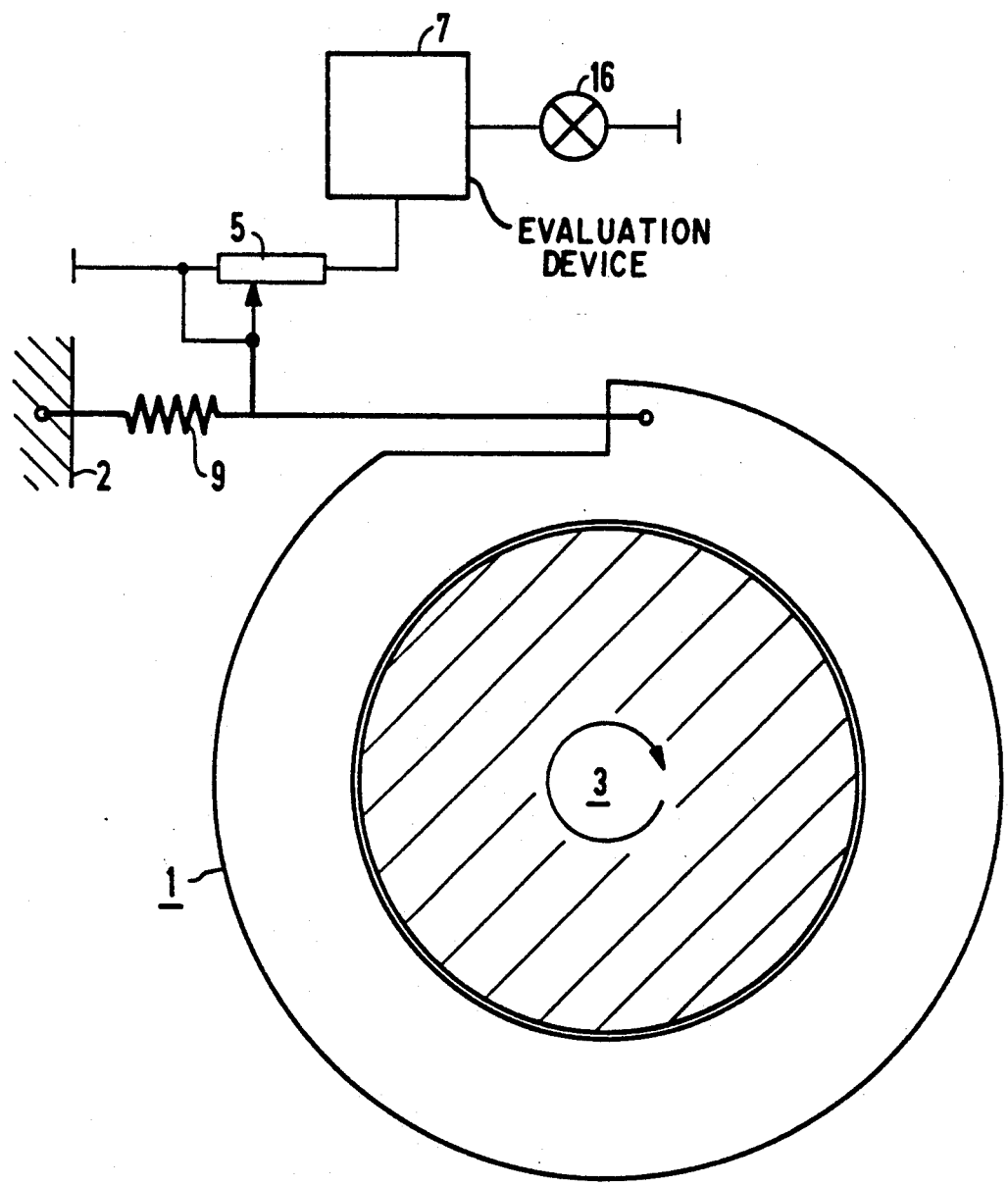
FIG. 1 is a diagrammatic, partly sectional view of a shaft seal with a schematic and block circuit diagram of a device for monitoring the shaft seal according to the invention.

Referring now to the figures of the drawing in detail and first, particularly, to FIG. 1 thereof, there is seen a sealing ring 1, which seals off a duct or feed-through of a shaft 3 from a housing, of which only a housing wall 2 is shown in this case. The sealing ring is not completely circular at its outer periphery, nor is this absolutely necessary along the lines of the invention. The term "ring" relates primarily to the circular or circular-cylindrical shape of the inner periphery of the sealing ring 1. A spring 9, which in the illustrated embodiment is in the form of a simple helical spring, is inserted between the sealing ring and the housing wall 2. If the shaft 3 rotates, a certain torque is exerted upon the sealing ring 1 which in turn leads to a force upon the spring 9, that pulls the spring apart in this specific case in proportion to the force, which in turn is dependent on the torque. The elongation of the spring 9 is determined by a measurement pickup 5 which, for instance, is a potentiometer with a displaceable contact that is connected to one end of the spring 9, which is largely rigidly joined to the sealing ring 1. The spreading apart of the spring 9 causes a displacement of a wiper or brush spring on the potentiometer, thereby varying the electrical properties of the measurement pickup 5 in accordance with the torque exerted on the sealing ring 1, which can be ascertained by means of an electrical evaluation device 7. The evaluation device 7 is supplied with a specified normal value for the torque exerted on the sealing ring 1 by the shaft 3. As a rule, this is a value that ensues upon normal operation. The evaluation device 7 compares the value ascertained through the measurement pickup 5 with the predetermined normal value and issues a report if the measured value deviates substantially from the normal value. In this specific case the report, for instance, means that a light 16 is caused to light up. Naturally, arbitrary forms for the report are possible, such as acoustical or electrical signals that are provided to further control devices of the overall system.

Figure 2:
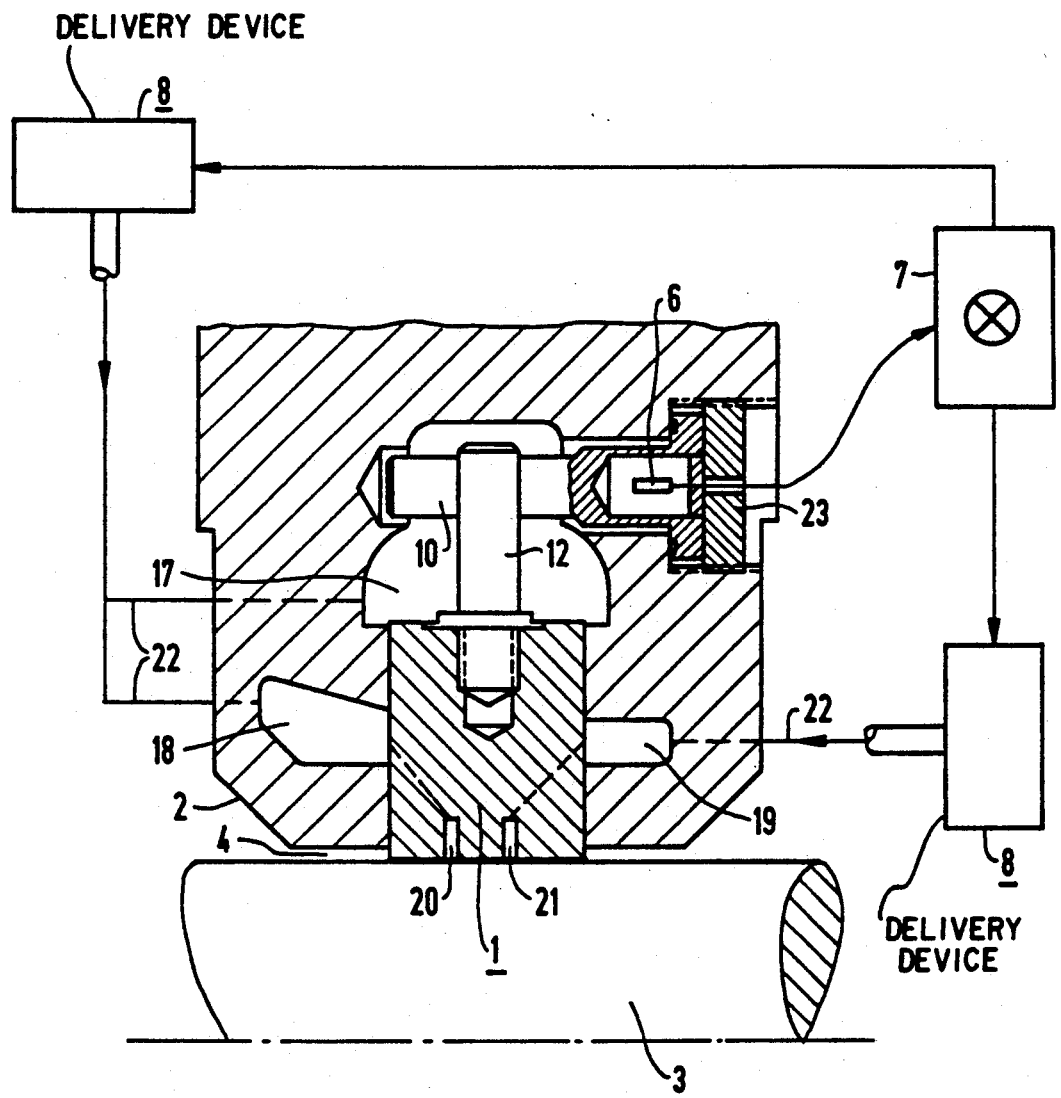
FIG. 2 is a fragmentary, partly sectional view of a specialized further development of the shaft seal according to the invention.

Further developments of the invention are shown in FIG. 2. FIG. 2 shows the sealing ring 1, which is introduced into a suitable recess in the housing wall 2 and serves to seal off a duct gap 4 between the housing wall 2 and the shaft 3. In order to achieve monitoring of a torque transmitted to the sealing ring 1 by the rotating shaft 3, a spring element in the form of a bending bar 10 is introduced into the housing wall 2 and is fixed by means of a bolt 23. A protrusion 12 on the sealing ring 1 is pressed against the bending bar 10 by the torque. As a result, the bending bar 10 is elastically bent and the bending is measured by means of a strain gauge 6 in combination with a suitable evaluation device 7 and processed further. In the illustrated case, the sealing ring 1 is substantially completely bathed by oil. The outer periphery of the sealing ring 1 protrudes substantially all the way into an oil groove 17, in which the bending bar 10 and the protrusion 12 are also located. Accordingly, the bending bar 10 must be sealingly installed in the housing wall 2, in order to avoid leakage from the oil groove 17. This explains the somewhat complicated fastening of the bending bar 10. The strain gauge 6 is located inside the bending bar 10, which may under some circumstances lessen the accuracy of measurement, but is necessary since the strain gauge must not be allowed to be moistened by fluid. The sides of the sealing ring 1 are also supplied with oil for lubricating and/or sealing purposes by oil grooves 18 and 19. This is necessary on one hand to assure the slidability of the sealing ring 1 relative to the housing wall 2 and on the other hand to attain the most complete possible sealing of the duct gap 4. The inner periphery of the sealing ring 1 is also provided with oil grooves 20 and 21. As a rule, the provision of an oil groove is necessary for the purposes of lubrication and sealing. Moreover, through the use of two oil grooves 20, 21, contamination of all the oil used for lubrication and sealing by a gas to be enclosed in the housing (such as hydrogen in the case of turbo generators) can be averted. Through the use of two separate oil systems, the contamination of the oil can be limited to an adequate extent. In the case shown, the delivery of the oil to the aforementioned oil grooves 17, 18, 19, 20 and 21 is effected through oil lines 22 from delivery devices 8. The delivery devices 8 communicate with the evaluation device 7 and can be regulated by it. Thus the sliding properties of the sealing ring 1 on the shaft 3 can be controlled by regulating the oil pressure. The single strain gauge 6 shown in FIG. 2 should be considered to represent a plurality of measurement pickups. The bending bar is bathed by oil and accordingly is exposed to a pressure load which naturally is also sensed by a measurement pickup mounted on the bending bar 10. Temperature fluctuations in the sealing oil, which also affect a measurement pickup, cannot be precluded as well. In the context of a configuration according to FIG. 2, it is therefore especially important to protect the measurement of the mechanical strain of the bending bar 10 from interfering influences. As already mentioned, this can be achieved with a bridge circuit of four measurement pickups.

Figure 3:
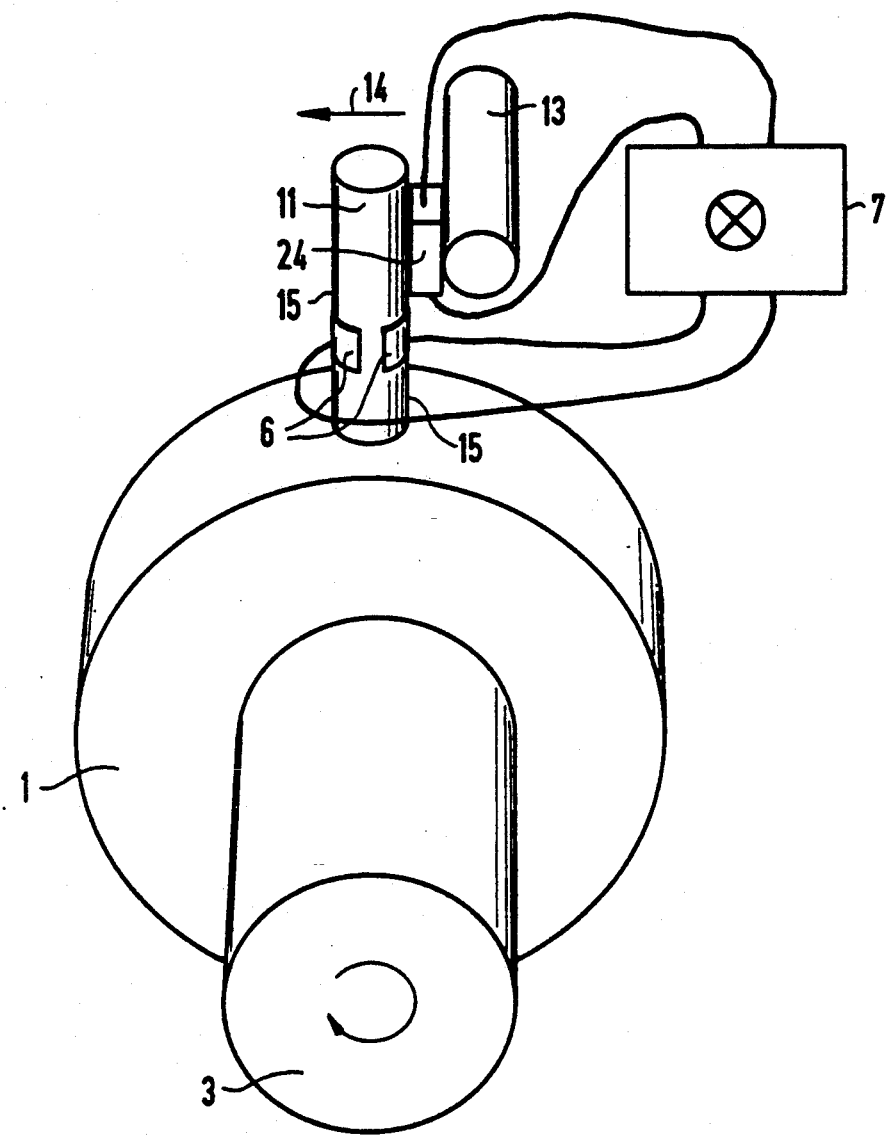
FIG. 3 is a perspective view relating to the particularly advantageous disposition of the measurement pickups in the context of the invention.

FIG. 3 shows a further, diagrammatic view of additional developments of the shaft seal according to the invention. The shaft 3 is surrounded by a sealing ring 1. A spring element in the form of a bending bar 11 is attached to the sealing ring 1. Similarly to the structure shown in FIG. 2, it may be screwed into the sealing ring 1. Through the use of the torque on the sealing ring 1 effected by the shaft 3, the bending bar 11 is pressed against an abutment 13, which is firmly joined to the housing, in a manner which is not shown for the sake of clarity. A piezoelectric measurement pickup 24 is inserted between the bending bar 11 and the abutment 13 and is compressed whenever the bending bar 11 presses against the abutment 13. Through the use of this compression, an electrical voltage arises at the piezoelectric measurement pickup 24, and this voltage can be measured and evaluated in a suitable evaluation device 7. The bending of the bending bar 11 by the torque generated by the rotating shaft 3 is effected in a bending direction 14 at a tangent with respect to the rotation. The bending bar 11 is provided with a strain gauge 6 on each side 15 through which the bending bar is defined along the bending direction 14. In this way, in order to determine the bending of the bending bar 11, two complementary signals are available to the evaluation device 7 connected to the strain gauge, so that a marked improvement in measurement accuracy can be attained.

The invention makes it possible to seal off a duct gap between a housing wall and a shaft that can be set into rotation relative to it with a sealing ring surrounding the shaft, in which the sliding properties of the sealing ring on the shaft can be measured at any time and can be evaluated for timely recognition of the threat of damage.

I claim:

1. A configuration for sealing off a duct gap between a housing wall and a shaft, comprising a shaft to be set into rotation relative to a housing wall and a sealing ring surrounding said shaft, said sealing ring sealing off said duct gap and being displaceable relative to the housing wall, at least one spring element to be placed under a mechanical strain by a torque exerted upon said sealing ring by the rotation of the shaft, and means for determining the stain and for indicating if the strain deviates substantially from a predeterminable normal value.

2. The configuration according to claim 1, wherein said means for determining the stain include at least one measurement pickup coupled to said spring element and an associated evaluation device connected to said measurement pickup for receiving signals from said measurement pickup and for indicating if the strain deviates substantially from the normal value.

3. The configuration according to claim 1, including at least one delivery device for delivering a lubricant to said sealing ring, said delivery device being coupled to and regulatable by said means for determining the strain.

4. The configuration according to claim 2, including at least one delivery device for delivering a lubricant to said sealing ring, said delivery device being coupled to and regulatable by said means for determining the strain.

5. The configuration according to claim 1, wherein
a) said spring element is at least one bending bar to be placed under strain by the torque; and
b) said means for determining the strain include at least one electrical measurement pickup on said bending bar, and an associated electrical evaluation device connected to said measurement pickup.

6. The configuration according to claim 5, wherein said at least one electrical measurement pickup is at least one strain gauge.

7. The configuration according to claim 5, wherein
a) said bending bar is firmly joined to the housing wall; and
b) said sealing ring has a protrusion to be pressed by the torque against said bending bar, such that said bending bar is placed under a strain by bending said bending bar.

8. The configuration according to claim 5, including an abutment firmly joined to the housing wall, said bending bar being firmly joined to said sealing ring and being pressed by the torque against said abutment and being bent thereby.

9. The configuration according to claim 7, wherein
a) said bending bar is bendable in one bending direction by the torque;

b) said bending bar has two sides defined orthogonally to said bending direction, and c) said at least one electrical measurement pickup includes strain gauges each being disposed at a respective one of said sides.

10. The configuration according to claim 8, wherein a) said bending bar is bendable in one bending direction by the torque;

b) said bending bar has two sides defined orthogonally to said bending direction, and c) said at least one electrical measurement pickup includes strain gauges each being disposed at a respective one of said sides.

11. The configuration according to claim 1, wherein said spring element includes an abutment firmly joined to the housing wall;

a) said sealing ring having a protrusion to be pressed by the torque against said abutment, such that said abutment is placed under a strain; and b) a piezoelectric measurement pickup disposed between said protrusion and said abutment.

* * * * *

UNITED STATES PATENT AND TRADEMARK OFFICE
CERTIFICATE OF CORRECTION

PATENT NO. : 5,233,862
DATED : August 10, 1993
INVENTOR(S) : Alexander Longree

It is certified that error appears in the above-indentified patent and that said Letters Patent is hereby corrected as shown below:

Column 6, Claim 1, Line 24, change "stain" to --strain--.

Column 6, Claim 2, Line 28, change "stain" to --strain--.

Signed and Sealed this

Nineteenth Day of April, 1994

*Attest:*

BRUCE LEHMAN

*Attesting Officer*  *Commissioner of Patents and Trademarks*